(12) United States Patent
Wu et al.

(10) Patent No.: US 9,086,899 B2
(45) Date of Patent: Jul. 21, 2015

(54) LOADING AND DEBUGGING METHOD AND DEBUGGING SYSTEM THEREOF

(75) Inventors: Xiaohui Wu, Shenzhen (CN); Haijian He, Shenzhen (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 89 days.

(21) Appl. No.: 13/258,285

(22) PCT Filed: Apr. 16, 2010

(86) PCT No.: PCT/CN2010/071838
§ 371 (c)(1),
(2), (4) Date: Apr. 10, 2012

(87) PCT Pub. No.: WO2010/148724
PCT Pub. Date: Dec. 29, 2010

(65) Prior Publication Data
US 2012/0222010 A1    Aug. 30, 2012

(30) Foreign Application Priority Data
Nov. 20, 2009   (CN) .......................... 2009 1 0221541

(51) Int. Cl.
*G06F 9/44* (2006.01)
*G06F 9/45* (2006.01)
*G06F 11/00* (2006.01)
*G06F 9/445* (2006.01)
*G06F 11/36* (2006.01)

(52) U.S. Cl.
CPC ............ *G06F 9/44521* (2013.01); *G06F 11/36* (2013.01); *G06F 11/362* (2013.01); *G06F 11/3624* (2013.01)

(58) Field of Classification Search
None
See application file for complete search history.

(56) References Cited

U.S. PATENT DOCUMENTS

| 5,659,753 A * | 8/1997 | Murphy et al. ............... 717/147 |
| 5,836,014 A * | 11/1998 | Faiman, Jr. ................... 717/156 |
| 6,918,111 B1 * | 7/2005 | Damron et al. ............... 717/161 |

(Continued)

FOREIGN PATENT DOCUMENTS

| CN | 1841329 A | 10/2006 |
| CN | 101246427 A | 8/2008 |

OTHER PUBLICATIONS

RealView Compilation Tools, Version 2.2, Compiler and Libraries Guide, 2002-2005 ARM Limited, ARM DUI 0205F.*

(Continued)

*Primary Examiner* — Don Wong
*Assistant Examiner* — Mohammad Kabir
(74) *Attorney, Agent, or Firm* — Ling Wu; Stephen Yang; Ling and Yang Intellectual Property (57) ABSTRACT

A loading and debugging method and a debugging system thereof are disclosed in the present invention, wherein the debugging method includes: loading a relocatable program according to an order of input segments in an ARM image file; compiling a link of the loaded relocatable program to generate an executable file; and loading the executable file into a debugging tool, to realize the debugging of the relocatable program. The present invention achieves the debugging of a dynamic program loaded dynamically, and addresses the issue that the symbol information of the loaded relocatable file cannot be acquired and the code debugging cannot be performed directly when the relocatable file is loaded dynamically.

2 Claims, 4 Drawing Sheets

(56) References Cited

U.S. PATENT DOCUMENTS

| | | | |
|---|---|---|---|
| 6,938,185 B1* | 8/2005 | Bebout et al. | 714/28 |
| 6,978,450 B2* | 12/2005 | Burch | 717/145 |
| 7,210,118 B2* | 4/2007 | Hastings | 717/100 |
| 7,565,647 B2* | 7/2009 | Davidov et al. | 717/140 |
| 7,661,102 B2* | 2/2010 | Ogle | 717/168 |
| 8,533,683 B2* | 9/2013 | Nash | 717/128 |
| 2002/0073398 A1* | 6/2002 | Tinker | 717/110 |
| 2012/0047350 A1* | 2/2012 | Lancaster et al. | 712/30 |

OTHER PUBLICATIONS

Liuzhichen, et al., Analysis and Application of ARM Mapping File Mechanism. Computer Engineering. Nov. 2005.

International Search Report for PCT/CN2010/071838 dated Aug. 5, 2010.

* cited by examiner

| Size | Type | Attribution (Attr) | Idx | Section Name | Object |
|---|---|---|---|---|---|
| 0x00000044 | Code | RO | 282 | i.LEAddItem | ******.o |
| 0x00000c2c | Code | RO | 285 | .text | ******.o |
| 0x00000fd8 | Code | RO | 289 | .text | ******.o |
| 0x0000073c | Code | RO | 292 | .text | ******.o |
| 0x00000284 | Code | RO | 295 | .text | ******.o |
| 0x0000035c | Code | RO | 297 | .text | ******.o |
| 0x00002a50 | Code | RO | 301 | .text | ******.o |
| 0x00000a10 | Code | RO | 306 | .text | ******.o |
| 0x00000494 | Data | RO | 307 | .constdata | ******.o |
| 0x000035a4 | Code | RO | 308 | .text | ******.o |
| 0x00000028 | Code | RO | 309 | i.LEGetCurSel | ******.o |
| 0x00000058 | Code | RO | 310 | i.LEMarkItem | ******.o |
| 0x00000030 | Code | RO | 311 | i.LEIsItemMarked | ******.o |
| 0x0000005c | Code | RO | 312 | i.LEGetItemByID | ******.o |
| 0x00000048 | Code | RO | 313 | i.match_leid | ******.o |
| 0x00000a10 | Data | RO | 315 | .constdata | ******.o |
| 0x00000588 | Code | RO | 317 | .text | ******.o |
| 0x00001528 | Code | RO | 319 | .text | ******.o |
| 0x00001588 | Data | RO | 322 | .constdata | ******.o |

FIG.1

| Size | Type | Attribution (Attr) | Idx | Section Name | Object |
|---|---|---|---|---|---|
| 0x00000284 | Code | RO | 295 | .text | ******.o |
| 0x0000035c | Code | RO | 297 | .text | ******.o |
| 0x00002a50 | Code | RO | 301 | .text | ******.o |
| 0x00000a10 | Code | RO | 306 | .text | ******.o |
| 0x000035a4 | Code | RO | 308 | .text | ******.o |
| 0x00000588 | Code | RO | 317 | .text | ******.o |
| 0x00001528 | Code | RO | 319 | .text | ******.o |
| 0x00000044 | Code | RO | 282 | i.LEAddItem | ******.o |
| 0x00000028 | Code | RO | 309 | i.LEGetCurSel | ******.o |
| 0x0000005c | Code | RO | 312 | i.LEGetItemByID | ******.o |
| 0x00000030 | Code | RO | 311 | i.LEIsItemMarked | ******.o |
| 0x00000058 | Code | RO | 310 | i.LEMarkItem | ******.o |
| 0x00000048 | Code | RO | 203 | i.TCSetTitle | ******.o |
| 0x00000048 | Code | RO | 313 | i.match_leid | ******.o |
| 0x0000000a | Data | RO | 2 | .constdata | ******.o |
| 0x00000002 | PAD | | | | |
| 0x00001ba8 | Data | RO | 5 | .constdata | ******.o |
| 0x000005f0 | Data | RO | 9 | .constdata | ******.o |
| 0x00000048 | Data | RO | 15 | .constdata | ******.o |
| 0x00000044 | Data | RO | 26 | .constdata | ******.o |
| 0x0000013c | Data | RO | 29 | .constdata | ******.o |

LOADING AND DEBUGGING METHOD AND DEBUGGING SYSTEM THEREOF

TECHNICAL FIELD

The present invention relates to the communication field, and in particular, to a loading and debugging method and a debugging system thereof in an embedded system.

BACKGROUND OF THE RELATED ART

With the development of science and technology, people's demand for mobile phones presents a trend of Personal Computer (PC), and the required application programs are increasing. At present, the dynamic loading technology is basically realized in smart phones, which is similar to the dynamic link library for Windows or the dynamic shared file for Linux on the PC, and can load applications dynamically; while the dynamic loading technology has not been implemented in most non-smart phones yet. Since the dynamic loading technology can not only improve the efficiency of the software development and load on demand to save hardware resources, but also meets the requirements for telecom operators to continuously extend the additional value-added services and for the mobile phone users to download and use new functions at any time; therefore implementing the dynamic loading technology in non-smart phones is an inevitable trend for the development of the non-smart phones. Accordingly, a debugging method which complements the technology also becomes an important factor to determine the technical and practical values of the technology.

The existing debugging methods for embedded systems are roughly divided into three modes: debugging through designing resident monitoring software, Joint Test Action Group (JTAG) debuggers and employing online debuggers, wherein employing a JTAG debugger is the most commonly used debugging mode during the development. At present, the existing debugging methods are all based on these three modes, to modify the implementation, monitor concerned debugging information in the debugging process and output the debugging information by means of facilitating understanding. Furthermore, all these debugging methods are used to debug the compiled and linked executable object codes, but have not involved a method for debugging relocatable object codes and debugging dynamically loaded relocatable programs.

There are a plurality of formats for relocatable files, such as the Portable Executable (PE) format of Microsoft, the Executable and Linkable Format (ELF) of Unix/Linux. The dynamically loaded relocatable files adopt link views in an ELF format, and therefore the debugging method of the relocatable files is also for the relocatable files in an ELF format. However, the existing debugging tools can not directly load the relocatable files for debugging.

SUMMARY OF THE INVENTION

The technical problem to be solved in the present invention is to provide a loading method, so that a debugging tool can directly load an executable file generated from a relocatable file by particular means, to debug a relocatable program.

In order to address the aforementioned problem, the present invention provides a loading method, which is applied to an Advanced RISC Machine (ARM) compiler system, comprising:

loading a relocatable program according to an order of input segments in an ARM image file; and compiling and linking the loaded relocatable program to generate an executable file, so as to realize loading of the relocatable program.

The step of loading a relocatable program according to an order of input segments in an ARM image file comprises:

comparing an order of the input segments during the relocatable program being loaded into a memory with the order of the input segments in the ARM image file to determine whether they are the same; and if they are the same, directly loading loadable sections in the relocatable program into the memory; otherwise, loading the loadable sections in the relocatable program into the memory according to the order of the input segments in the ARM image file.

Before the comparison step, the method further comprises: viewing the order of the input segments during the relocatable program being loaded into the memory by the following mode:

when segment classification based on the section types is carried out during the relocatable program being loaded into the memory, viewing a classification order of the sections by adding print information or by a debugging tool.

The step of compiling a link of the loaded relocatable program to generate an executable file comprises:

modifying setting of linking process parameters of an ARM compiler and linker; and utilizing the ARM compiler and linker to compile a link of the loaded relocatable program, so as to generate an Executable and Linkable Format (ELF) file.

The step of modifying setting of the linking process parameters of an ARM compiler and linker comprises:

setting an option of not scanning a C library in the ARM compiler and linker, for not scanning a C/C++ runtime library during the linking.

setting an option of an undefined symbol, for directing all of the undefined symbols to the same existing symbol;

setting an option of not removing, for reserving all segments during the linking; and setting an entry of the generated image file, setting an address value when an output segment with an output segment property being read-only is loaded, and setting an address value when the output segment with the output segment property being rewritable is loaded.

The existing symbol is a default startup interface name of the relocatable program, or any existing symbol in the relocatable program.

Another technical problem to be solved by the present invention is to provide a debugging method and system, which can facilitate implementing debugging of a dynamically loaded relocatable program.

In order to solve the above problem, the present invention provides a debugging method, which is applied to an Advanced RISC Machine (ARM) compiler system, comprising:

loading a relocatable program according to an order of input segments in an ARM image file;

compiling a link of the loaded relocatable program to generate an executable file; and loading the executable file into a debugging tool, to realize debugging of the relocatable program.

The step of compiling a link of the loaded relocatable program to generate an executable file comprises:

modifying setting of linking process parameters of the ARM compiler and linker; and utilizing the ARM compiler and linker to compile a link of the loaded relocatable program, so as to generate an executable ELF file.

The step of modifying setting of linking process parameters of the ARM compiler and linker comprises:

setting an option of not scanning in the ARM compiler and linker, for not scanning a C/C++ runtime library during the linking;

setting an option of an undefined symbol, for directing all of the undefined symbols to the same existing symbol;

setting an option of not removing, for reserving all segments during the linking; and setting an entry of the generated image file, setting an address value ro_base when an output segment with an output segment property being read-only is loaded, and setting an address value rw_base when the output segment with the output segment property being rewritable is loaded.

The value of ro_base is set as an actual loaded address of a text segment of the relocatable program loaded into the memory, or as a default value; and when an actual loaded address of a data segment is different from an address of an executable data segment of the executable file, the value of rw_base is set as the actual loaded address of the data segment of the relocatable program loaded into the memory.

The step of loading the executable file into a debugging tool specifically comprises:

loading the loaded relocatable program into the memory, to determine the actual loaded address of the relocatable program, including the actual loaded address of the text segment and the actual loaded address of the data segment;

loading the executable file into the debugging tool after the loaded address where the executable file is loaded into the debugging tool is determined according to the following mode: the loaded address of the data segment of the executable file being the value of rw_base; and when the value of ro_base is set as a default value, or as the actual loaded address of the text segment, a loaded offset address of the text segment of the executable file is the actual loaded address of the text segment minus the value of ro_base.

The present invention further provides a debugging system, comprising a loading device, a link compiling device, and a debugging tool, wherein, the loading device is configured to load a relocatable program according to an order of input segments in an Advanced RISC Machine (ARM) image file;

the link compiling device is configured to compile a link of the loaded relocatable program to generate an executable file; and the debugging tool is configured to load the executable file, to realize debugging of the relocatable program, so as to support the debugging of the relocatable program.

The link compiling device is an ARM compiler and linker, and the ARM compiler and linker configures linking process parameters by the following mode:

an option of not scanning the C library, for not scanning a C/C++ runtime library during the linking;

an option of an undefined symbol, for directing all of the undefined symbols to the same existing symbol;

an option of not removing, for reserving all segments during the linking; and an entry of the generated image file, an address value ro_base when an output segment with an output segment property being read-only is loaded, and an address value rw_base when the output segment with the output segment property being rewritable is loaded.

In summary, the present invention provides a method for loading and debugging a dynamically loaded relocatable file in an embedded system, which at least has the following beneficial effects:

the research of a method for debugging a dynamically loaded relocatable file is carried out, and the issue that the symbol information of the loaded relocatable file cannot be acquired and the code debugging cannot be performed directly when the relocatable file is loaded dynamically, is addressed; and the debugging of a dynamic program loaded dynamically is realized, the development requirement is met, and the independent development and compiling of applications and a platform are achieved; only the modified program loaded dynamically is needed to be compiled, and copied into a file system to be reloaded during the debugging without refabricating and burning the platform version, so that a lot of time is saved, and the effort is mainly expended on debugging applications themself, thus greatly improving the efficiency of application development, and laying the solid application foundation for the implementation of the dynamic loading technology by loading the relocatable file.

BRIEF DESCRIPTION OF DRAWINGS

From the following detailed description in combination with accompanying drawings, the reasons, methods, features and advantages for the implementation of each step of the present invention will be understood more clearly, wherein, FIG. 1 is a diagram of an order of input segments of a dynamically loaded image file in the related art;

FIG. 2 is a diagram of an order of input segments of an executable file generated by ARM compiling the link;

PREFERRED EMBODIMENTS OF THE
PRESENT INVENTION

The core idea of the present invention is: firstly loading a relocatable program into a memory according to an order of input segments in an Advanced RISC Machine (ARM) image file, secondly compiling the link of the relocatable program by an ARM compiler and linker to generate an executable file, and loading the executable file into a debugging tool to acquire symbol information of the relocatable program, so as to realize loading and debugging the dynamically loaded relocatable program.

Since the process of loading the relocatable program dynamically is a process that "text segment", "data segment" and "Block Started by Symbol (bss) segment" are extracted from the relocatable program to be loaded into the memory and then are linked, a symbol table of the loaded relocatable file is invisible, and the dynamic program cannot be debugged intuitively. Therefore, it is needed to make the relocatable file be generated into an executable file, in order to be loaded into the debugging tool to acquire the symbol information thereof.

In addition, as the link process of a simplified version of a linker implemented by the dynamically loaded relocatable program is different from that of the ARM compiler and linker, it will lead to not being able to carry out the debugging correctly in the condition that the symbol information is inconsistent with the actual address of the text, even if there is symbol information. Therefore, the process of the dynamic loading is needed to be modified.

Figure 4:
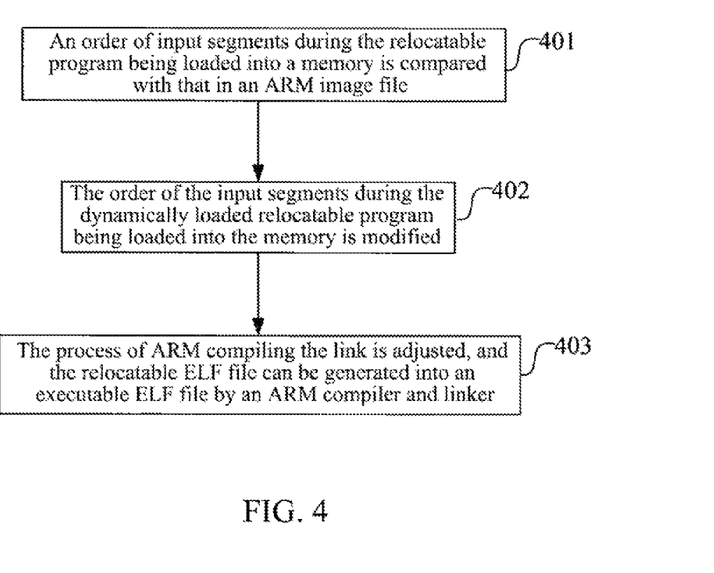
FIG. 4 is a flow chart of a method for implementing loading a dynamically loaded relocatable program in accordance with an embodiment of the present invention.

Based on the aforementioned idea, the method for implementing loading a dynamically loaded relocatable program in accordance with the present invention mainly comprises the following steps.

In step 401, an order of input segments during the relocatable program being loaded into the memory is compared with that in an ARM image file.

In step 402, the order of the input segments during the dynamically loaded relocatable program being loaded into the memory is modified;

In step 403, the process of ARM compiling the link is adjusted, and the relocatable ELF file is generated into an executable ELF file by an ARM compiler and linker.

After the above loading process, the generated ELF file is loaded into a Trace32, a symbol table of the relocatable program is visible in the Trace32 and the debugging can be carried out correctly.

Figure 5:
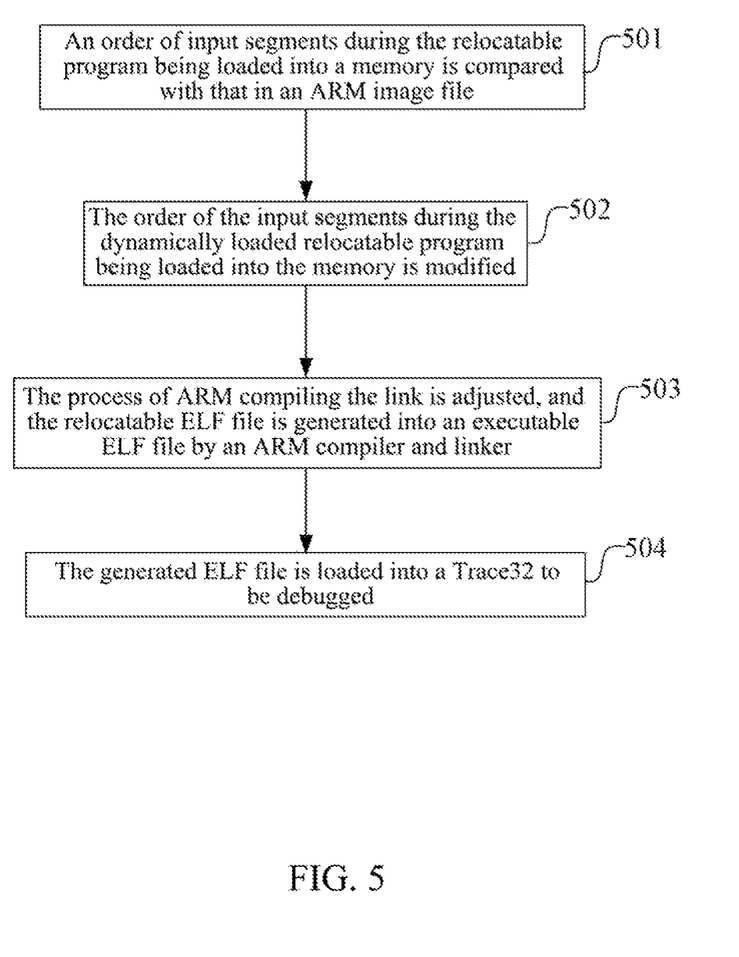
FIG. 5 is a flow chart of a method for debugging a dynamically loaded relocatable program in accordance with an embodiment of the present invention.

Based on the aforementioned loading method, the present invention provides a method for debugging a dynamically loaded relocatable program, which mainly comprises the following steps.

In step 501, an order of input segments during the relocatable program being loaded into a memory is compared with that in an ARM image file.

In step 502, the order of the input segments during the dynamically loaded relocatable program being loaded into the memory is modified.

In step 503, the process of ARM compiling the link is adjusted, and the relocatable ELF file is generated into an executable ELF file by an ARM compiler and linker.

In step 504, the generated ELF file is loaded into a Trace32 to be debugged.

Thus, by comparing the link process of a simplified version of a linker implemented by the dynamically loaded relocatable program with that of the ARM compiler and linker, the present invention analyzes their differences, modifies respective linking process parameter to guarantee the consistency between their linking processes; and then uses the ARM compiler and linker to set the specific linking parameters thereof and link the relocatable program into an executable ELF file, so that the ELF file can be loaded into the Trace32, thus implementing the debugging of the relocatable program correctly.

The implementation process of the technical scheme in accordance with the present invention will be illustrated in further detail in combination with the accompanying drawings and specific embodiments in the following.

As shown in FIG. 1, in the related art, an order of input segments in a dynamically loaded image file is: "text segment", "data segment" and "bss segment". Wherein, i.LEAddItem, i.LEMarkItem and so on are all the text segments.

It can be known from an order rule of the input segments in the ARM image file that, the input segments are sorted according to properties of the input segments, i.e., being ordered according to read-only text segments, read-only data segments, rewritable data segments, other initialized data segments and block started by symbol data segments, and the input segments with the same property are sorted according to the American Standard Code for Information Interchange (ASCII) order of the input segment name.

Therefore, in order to guarantee that the order the input segments between the image file loaded dynamically into the memory is the same order as that of an executable file into which an ARM compiler and linker makes the relocatable file to be generated, in the preferable embodiment of the present invention, sections which can be loaded are loaded into the memory according to the same order during the implementation of dynamic loading, and the order of the input segments of the executable file generated by ARM compiling the link is as shown in FIG. 2. Thus, the problem of the inconsistency between the symbol information of the dynamically loaded program and the actual codes can be solved.

In addition, as the optimization function of the ARM compiler and linker will remove repeated text segments and unused segments, while the dynamic loading only implements a simple linker, and does not have a removing function, it is needed to set some link properties of ARM and not remove these segments during the linking, so as to ensure that the symbol information of the dynamically loaded program is consistent with the actual debugging codes.

In the present embodiment, after performing the above modification on the dynamic loading process, the relocatable file is generated into an executable file using the ARM compiler and linker by the following means: since the file is a relocatable file, and directly linking and generating an executable file will fail due to a part of undefined symbols; controls need to be performed through options such as --no_scanlib, --unresolved and so on, so that a C/C++ runtime library is not scanned during the linking thereof, and all of the undefined symbols are directed to the same existing symbol. In addition, an initial entry thereof needs to be specified through the --entry, and an addresses when an output segment with a RO property is loaded and an address when an output segment with a RW property is loaded needs to be specified through the --ro_base and --rw_base. Thus, the relocatable file can be linked and be generated into an executable file successfully, and the loaded address thereof is consistent with a loaded address during the dynamic loading.

Figure 6:
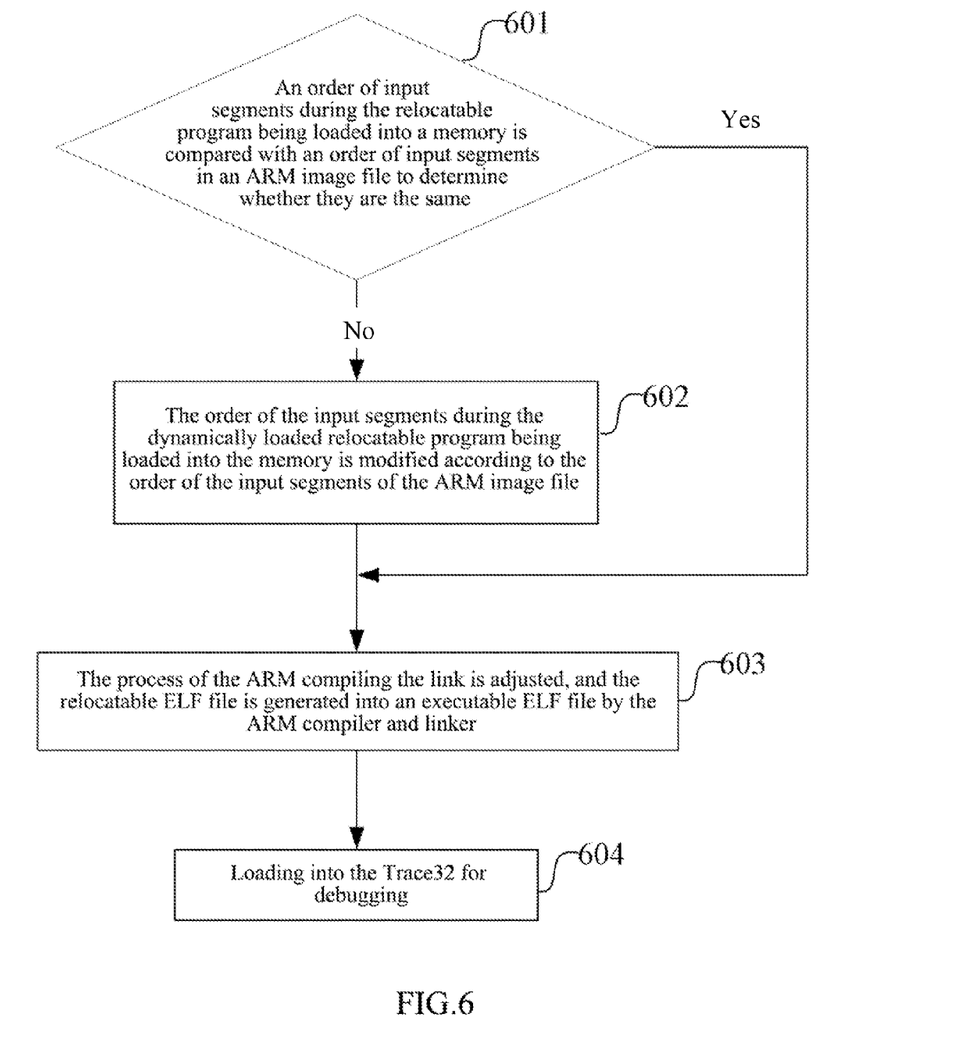
FIG. 6 is a flow chart of loading and debugging a relocatable program in accordance with an embodiment of the present invention.

The loading and debugging processes of a relocatable program in accordance with the present embodiment will be illustrated in further detail in the following. The process comprises the following steps.

In step 601, an order of input segments during the relocatable program being loaded into a memory is compared with an order of input segments in an ARM image file to determine whether they are the same; and if they are the same, skip to step 603, otherwise, proceed to step 602.

Specifically, when the segment classification based on the section types (that is, there are three segments, i.e., "text segment", "data segment" and "bss segment", and each segment comprises a plurality of sections) is carried out during the dynamic loading, a classification order of the sections is viewed by adding print information or by a debugging tool. Especially whether the sections of the text segment are sorted according to an order of read-only text segments and read-only data segments is viewed. Whether the read-only text segments are sorted according to an order of the ASCII codes of the section names, and whether the read-only data segments are sorted according to an order of constdata and conststring. Finally, the sections of the data segment and the bss segment are sorted.

In step 602, the order of the input segments during the dynamically loaded relocatable program being loaded into the memory is modified according to the order of the input segments of the ARM image file, and proceed to step 603.

The order of the input segments during the dynamically loaded relocatable program being loaded into the memory is modified, so as to ensure that the segments loaded into the memory are sorted according to an order of read-only text segments, read-only data segments, rewritable data segments, other initiated data segments and block started by symbol data segments; the input segments with the same property further need to be sorted according to an order of the ASCII codes of the input segment names, and at last the input segments are loaded into the memory in the sorted order. After the order of the input segments loaded into the memory is modified according to the order, it is basically guaranteed that the code loaded into the memory is consistent with the code actually loaded into the debugging tool; however, if the completely consistent effect is desired to be achieved, the operation described in the third step is needed to be taken.

In step 603, the process of the ARM compiling the link is adjusted, and the relocatable ELF file is generated into an executable ELF file by the ARM compiler and linker.

Since there are a part of undefined symbols in the relocatable ELF file, some special linking options are required to be added to guarantee that the relocatable ELF file is linked correctly to be generated into the executable file.

At first, an option of --no_scanlib (not scanning a C library) is added, so that a default C/C++ runtime library is not scanned to parse referenced symbols in each target file. In addition, an option of --unresolved symbol (undefined symbol) is added to make all the undefined symbols be directed to the same existing symbol. The symbol can be set by users themselves, as long as it is a defined symbol in the relocatable file. In general, the existing relocatable program (the dynamic program) each has a default start-up interface, and therefore, preferably, the symbol can be specified as a name of the default startup interface.

Secondly, an option of --no_remove (not removing) is added, so that the ARM linker reserves all segments rather than removing unused segments during the linking. Its purpose is to keep the consistency with the input segments loaded into the memory dynamically, because the simple linker implemented during the dynamic loading is unable to identify the unused segments temporarily, and does not remove the unused segments as well.

At last, an entry of the generated the image file, an address of the output segments with the RO (read-only) property is loaded, and an address of the output segments with the RW (rewritable) property is loaded, i.e., the options of entry, --ro_base and --rw_base need to be set. Wherein, --ro_base can be manually set as a loaded address of an actual text segment of the relocatable program loaded into the memory; alternatively, --ro_base can also not be set, and a default value is 0x8000. While the property of --rw_base must be manually set when a loaded address of an actual data segment is inconsistent with an address of an executable data segment of the generated ELF, and a value of --rw_base is set as the loaded address of the actual data segment of the relocatable program loaded into the memory, so as to guarantee that the data value of the data segment is correct.

After the above settings, the relocatable ELF file can be generated into a corresponding executable ELF file used for Trace32 for debugging, by the ARM compiler and linker. The specific operation method of the debugging is as shown in the fourth step.

In the fourth step, the executable ELF file is loaded into the Trace32 to be debugged.

After being loaded into the memory, the dynamically loaded relocatable program can be debugged.

Firstly, an actual loaded address of the relocatable program actually loaded into the memory is required to be determined, including loaded address values of the text segment and the data segment.

Figure 3:
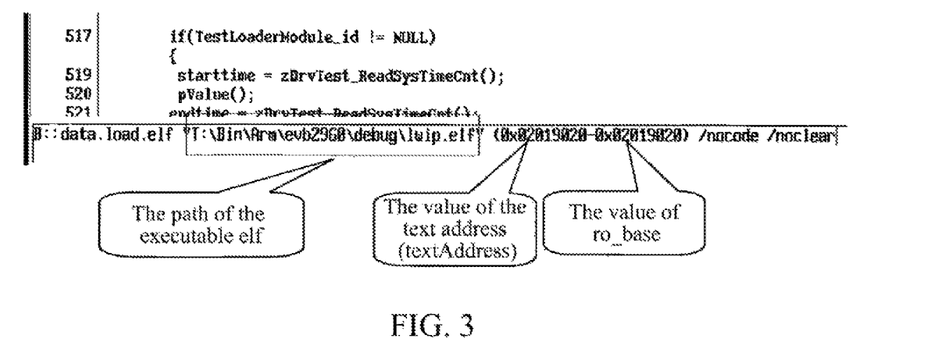
FIG. 3 is a diagram of a loading process of using a Trace32 debugging tool in accordance with an application embodiment of the present invention.

Secondly, the executable ELF file generated in the third step is loaded by the Trace32, and it should be noted that, when a value of ro_base is the actual loaded address of the text segment, the loaded address is said actual loaded address of the text segment, and the loaded offset address value is 0; when ro_base is a default value, as shown in FIG. 3, in order to make the loaded address be the loaded address of the actual text segment (textAddress), the loaded offset address value equal to the actual loaded address minus the value of ro_base. Being loaded in this manner, no matter how to set ro_base, it can be ensured that the executable ELF file is properly loaded at the actual loaded address of the text segment via the offset. While a loaded address value of the data segment is the value of rw_base.

At last, after being successfully loaded according to the above steps, the symbol information of the relocatable dynamically loaded program can be acquired to be debugged.

In addition, in the embodiment of the present invention, a debugging system of a relocatable program is provided, and the system comprises a loading device, a link compiling device and a debugging tool.

Wherein, the loading device is configured to load the relocatable program according to an order of input segments in an ARM image file.

The link compiling device is configured to compile a link of the loaded relocatable program to generate an executable file.

The debugging device is configured to load the executable file, so as to realize the debugging of the relocatable program.

Wherein, the link compiling device is an ARM compiler and linker, and linking process parameters of the ARM compiler and linker are modified as follows.

An option of not scanning is set in the ARM compiler and linker, which is used for not scanning a C/C++ runtime library during the linking.

An option of undefined symbol is set, which is used for directing all the undefined symbols to the same existing symbol.

An option of not removing is set, which is used for reserving all segments during the linking.

An entry of the generated image file, an address value ro_base when the output segment with an output segment property being read-only is loaded, an address value rw_base when the output segment with output segment property being rewritable is loaded are set.

The above description is only the preferred embodiments of the present invention, and is not intended to limit the protection scope of the present invention. The present invention can have a plurality of other embodiments. For those skilled in the art, corresponding equivalent variations and alternatives can be made according to the technical scheme and the concept of the present invention without departing from the spirit and substance of the present invention, and all these corresponding variations and alternatives should belong to the protection scope of appended claims of the present invention.

INDUSTRIAL APPLICABILITY

The present invention realizes the debugging of a dynamic program loaded dynamically is realized, the development requirement is met, and the independent development and compiling of applications and a platform are achieved; only the modified program loaded dynamically is needed to be compiled, and copied into a file system to be reloaded during the debugging without refabricating and burning the platform version, so that a lot of time is saved, and the effort is mainly expended on debugging applications themself, thus greatly improving the efficiency of application development, and laying the solid application foundation for the implementation of the dynamic loading technology by loading the relocatable file.

What we claim is:

1. A debugging method, wherein, the method is applied to an Advanced RISC Machine (ARM) compiler system, the method comprises:

comparing a sequence of input segments during a process of loading a relocatable program into a memory with a sequence of input segments in an ARM image file;

when the sequence of the input segments during a process of loading the relocatable program into a memory and the sequence of the input segments in the ARM image file are the same, directly loading the loadable sections in the relocatable program into the memory; when the sequence of the input segments during a process of loading the relocatable program into a memory and the sequence of the input segments in the ARM image file are different, modifying the sequence of the input segments during the process of loading the relocatable program into the memory according to the sequence of the input segments of the ARM image file;

modifying a linking process parameters setting of an ARM compiler and linker and then compiling and linking the loaded relocatable program by using the ARM compiler and linker to generate an executable file, wherein modifying the linking process parameters setting of the ARM compiler and linker comprises:

setting a not scanning option in the ARM compiler and linker, for not scanning C/C++ runtime libraries during a linking;

setting an undefined symbol option, for directing all undefined symbols to a same existing symbol;

setting a no removing option, for reserving all segments during the linking; and setting an entry of a generated image file, setting an address value ro_base as a loaded address of an output segment that has a read-only attribute, and setting an address value rw_base as a loaded address of an output segment that has a read-write attribute;

wherein, the value of ro_base is set either as an actual loaded address of a text segment of the relocatable program loaded into the memory or as a default value;

when an actual loaded address of a data segment is different from an address of an executable data segment of the executable file, the value of rw_base is set as the actual loaded address of the data segment of the relocatable program loaded into the memory;

loading the executable file into a debugging tool, to realize debugging of the relocatable program, wherein loading the executable file into the debugging tool comprises:

loading the relocatable program into the memory, and determining actual loaded addresses of the relocatable program, including an actual loaded address of a text segment and the actual loaded address of the data segment;

loading the executable file into the debugging tool after a loading address for the executable file to be loaded into the debugging tool is determined according to the following mode:

the loading address of a data segment of the executable file being the value of rw_base, when the value of ro_base was set as default value, or as the actual loaded address of the text segment, the value of a loaded offset address of the text segment of the executable file is the actual loaded address of the text segment minus the value of ro_base.

2. A debugging system, comprising at least one processor executing a loading device, a link compiling device, and a debugging tool, wherein, the loading device is configured to compare a sequence of input segments during a process of loading a relocatable program into a memory with a sequence of input segments in an ARM image file;

when the sequence of the input segments during a process of loading the relocatable Program into a memory and the sequence of the input segments in the ARM image file are the same, directly loading loadable sections in the relocatable program into the memory; when the sequence of the input segments during a process of loading the relocatable program into a memory and the sequence of the input segments in the ARM image file are different, modifying the sequence of the input segments during the process of loading the relocatable program into the memory according to the sequence of the input segments of the ARM image file;

the link compiling device is configured to modify a linking process parameters setting of an ARM compiler and linker and then compiling and linking the loaded relocatable program by using the ARM compiler and linker to generate an executable file, wherein modifying the linking process parameters setting of the ARM compiler and linker comprises:

setting a not scanning option in the ARM compiler and linker, for not scanning C/C++ runtime libraries during a linking;

setting an undefined symbol option, for directing all undefined symbols to a same existing symbol;

setting a no removing option, for reserving all segments during the linking; and setting an entry of a generated image file, setting an address value ro_base as a loaded address of an output segment that has a read-only attribute, and setting an address value rw_base as a loaded address of an output segment that has a read-write attribute;

wherein, the value of ro_base is set either as an actual loaded address of a text segment of the relocatable program loaded into the memory or as a default value;

when an actual loaded address of a data segment is different from an address of an executable data segment of the executable file, the value of rw_base is set as the actual loaded address of the data segment of the relocatable program loaded into the memory;

the debugging tool is configured to load the executable file to realize debugging of the relocatable program, wherein loading the executable file comprises:

loading the relocatable program into the memory, and determining actual loaded addresses of the relocatable program, including an actual loaded address of a text segment and the actual loaded address of the data segment;

loading the executable file into the debugging tool after a loading address for the executable file to be loaded into the debugging tool is determined according to the following mode:

the loading address of a data segment of the executable file being the value of rw_base, when the value of ro_base was set as default value, or as the actual loaded address of the text segment, the value of a loaded offset address of the text segment of the executable file is the actual loaded address of the text segment minus the value of ro_base;

so as to support debugging of the relocatable program.

* * * * *